United States Patent [19]

Peterson

[11] 4,394,940
[45] Jul. 26, 1983

[54] DISPENSER FOR FLUENT MATERIALS

[76] Inventor: Oscar F. A. Peterson, 3125 Portage Ave., Winnipeg, Manitoba, Canada, R3K 0W4

[21] Appl. No.: 262,317

[22] Filed: May 11, 1981

[51] Int. Cl.³ ............................................ G01F 11/24
[52] U.S. Cl. ................................. 222/276; 222/307; 222/362
[58] Field of Search ............... 222/282, 305, 307, 308, 222/276, 362

[56] References Cited

U.S. PATENT DOCUMENTS 1,219,651  3/1917  McDonald et al. ................. 222/305
2,616,591  11/1952  Haugen ................................. 222/307
3,179,304  4/1965  Heilbrunn ............................ 222/308

Primary Examiner—Joseph J. Rolla
Assistant Examiner—Frederick R. Handren
Attorney, Agent, or Firm—Stanley G. Ade

[57] ABSTRACT

A hopper is supported above a supporting surface and includes a pair of spaced apart apertures in the base. A metering and dispensing plate is rotatable from one position to another below the base and includes a pair of spaced apart metering apertures each of which aligns alternatively with the apertures in the base of the hopper as the plate is moved from one position to the other. When one metering aperture is aligned with one aperture in the base, the other metering aperture is aligned with a dispensing aperture in a base plate below the metering and dispensing plate. The material from the hopper flows into the aligned metering aperture and the material already in the other metering aperture flows out through the dispensing aperture. The metering apertures are adjustable in volume by rotating the handle extending from the plate which is also used to partially rotate the plate from side to side. The device is designed for fluent materials particularly powdered or granular materials such as sugar, instant coffee or the like.

5 Claims, 12 Drawing Figures

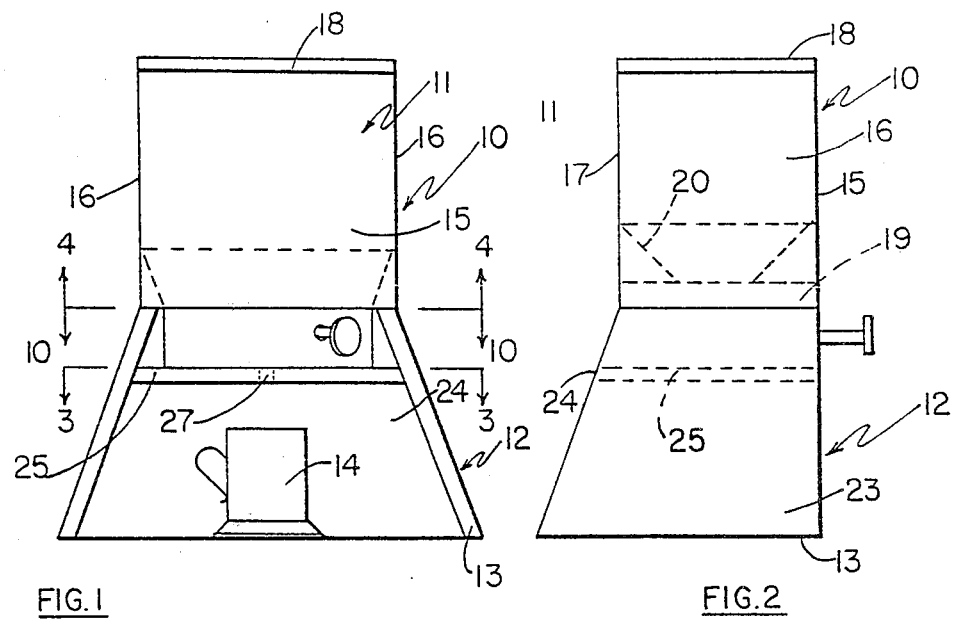
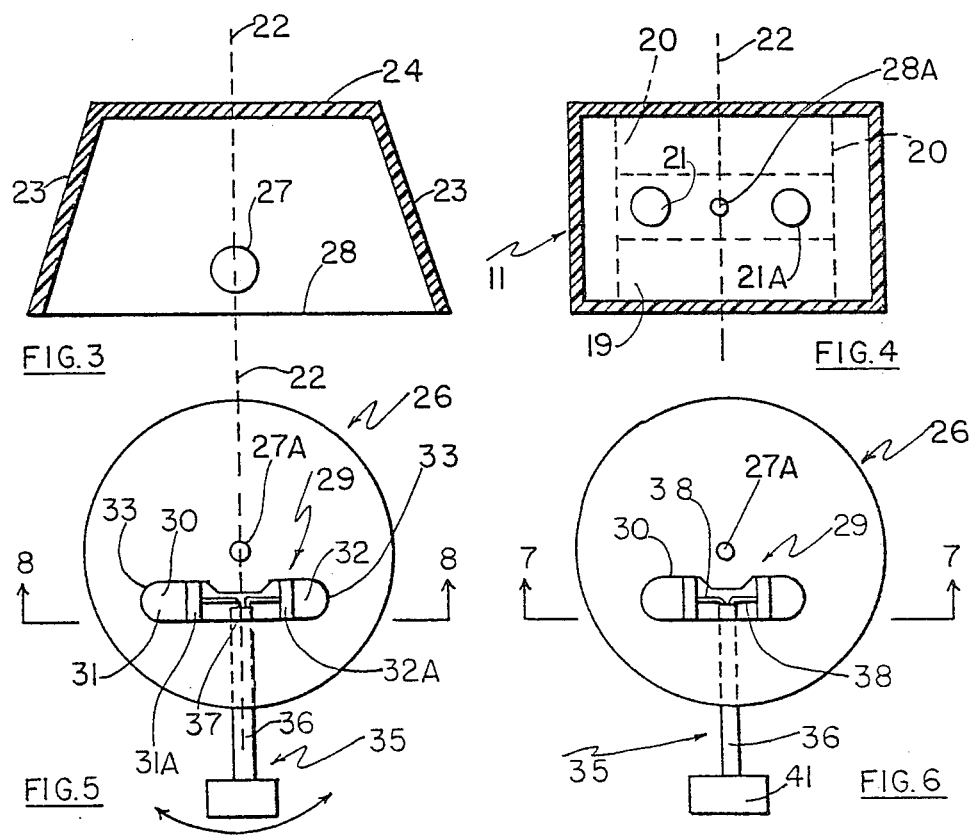

DISPENSER FOR FLUENT MATERIALS

BACKGROUND OF THE INVENTION

This invention relates to new and useful improvements in dispensers, particularly dispensers for fluent materials such as powdered or granular materials similar to powdered milk, sugar, instant coffee and the like. However, it will be appreciated that the dispenser is not limited to use with these materials.

It is desirable when using such materials, that they be dispensed reasonably accurately and with a certain consistency of volume so that the user can be assured of obtaining exactly the same amount each time. For example, with instant coffee, individual tastes vary and it is not always desirable that a level teaspoon or tablespoon of the instant coffee powder be used. Some people prefer a stronger coffee and others prefer a weaker brew. With conventional measuring spoons it is difficult to adjust upwardly or downwardly with any consistency so that unless a level measure is required, such consistency is impossible to obtain. The same remarks may be applied to the dispensing of powdered milk, sugar and other such commodities.

Certain dispensers for fluent materials are known but once again these usually are provided with fixed dispensing volumes so that once again it is difficult to adjust for individual tastes.

The present invention overcomes these disadvantages by providing an automatic dispenser for such materials in which the metering portions thereof are readily adjusted from a maximum to a minimum volume and any desired volume therebetween, merely by turning the actuating lever or handle thus enabling an individual to obtain the desired volume of material on a repeatable basis.

In accordance with the invention there is provided a dispenser for fluent materials comprising in combination a hopper for holding said material, said hopper including an apertured base, said apertured base including a pair of feeding apertures one on each side of a center line of said base, a metering and dispensing plate supported below said base for partial rotational movement relative to the vertical axis of said dispenser from one dispensing position through to another dispensing position and vice versa, means to support said plate relative to said base, dispensing means situated below said plate and operatively connected therewith, and means in said plate for metering fluent material from said hopper and dispensing same through said dispensing means, said means in said plate including aperture means formed through said plate, one of said aperture means aligning with one of said feeding apertures in said base and the other of said apertures aligning with said dispensing means, when said plate is in one dispensing position, and the other of said aperture means aligning with the other of said feeding apertures and the one said aperture means aligning with said dispensing means, when said plate is in the other dispensing position.

Another aspect of the invention consists of a dispenser for fluent materials comprising in combination a hopper for holding said material, support means for said hopper, said hopper including a base having a pair of feeding apertures therethrough, a dispensing plate supported below said base, means to support said plate for partial rotation about a vertical axis, from a metering position to a dispensing position and vice versa, a pair of metering apertures formed through said plate and dispensing means situated below said plate and communicating therewith, said plate being movable from a first position to a second position and vice versa, one of said metering apertures being operatively connected to one of said feeding apertures, and the other of said metering apertures being operatively connected to said dispensing means, when said plate is in one position, and the other of said metering apertures being operatively connected with the other of said feeding apertures and said one of said metering apertures being operatively connected to said dispenser means, when said plate is in the other position.

A yet further advantage of the invention is to provide a device of the character herewith described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is a front elevation of one embodiment of the device.

FIG. 2 is a side elevation of FIG. 1.

FIG. 3 is a cross sectional view along the line 3—3 of FIG. 1.

FIG. 4 is a cross sectional underside view of FIG. 1 substantially along the line 4—4 thereof.

FIG. 5 is a top plan view of the dispensing and metering plate per se with the adjustable walls in the maximum position.

FIG. 6 is a view similar to FIG. 5 but with the adjustable walls in the minimum position.

In the drawings like characters of reference indicate corresponding parts in the different figures.

DETAILED DESCRIPTION

Figure 7:
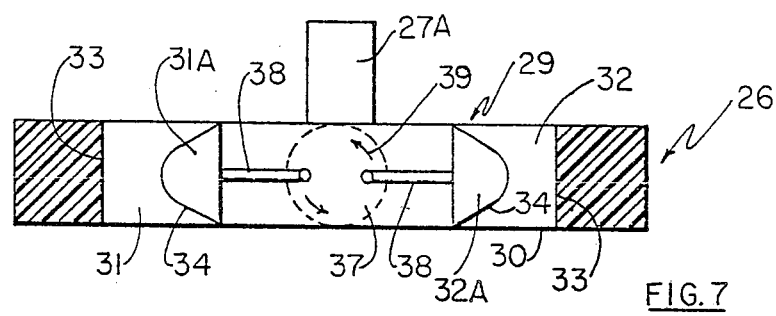
FIG. 7 is an enlarged cross sectional view along the line 7—7 of FIG. 6.

Proceeding therefore to describe the invention in detail, reference to FIGS. 1 and 2 show the device collectively designated 10 which may be manufactured of plastic, metal, wood or any convenient material.

It consists of a hopper collectively designated 11 supported upon a supporting base collectively designated 12 so that the hopper is spaced above the lower side 13 of the supporting base thus allowing room for a receptacle such as a mug or cup 14 to be situated below the hopper when it is desired to dispense material from the hopper into the cup or mug or any other convenient receptacle.

In detail, the hopper is a substantially four sided container including a front side 15, a pair of sides 16 and a rear side 17 with a detachable cover 18 surmounting the four sides. A base 19 is provided and it is desired that the lower portion of the hopper be provided with sloping baffles such as those illustrated in phantom by reference character 20, to direct material within the hopper, to spaced apart feed apertures 21 formed through the base 19 and shown in FIG. 4, one upon each side of a fore and aft center line 22.

The supporting base in this embodiment, includes a pair of spaced apart panels 23 extending downwardly from the hopper and having a rear panel 24 extending across the rear edges of the support panels 23 thus providing a firm support for the hopper and enclosure to detachably receive the receptacle 14.

A base plate 25 extends between the panels 23 and the panel 24 in spaced and parallel relationship with the base 19 of the hopper thus defining an opening therebetween which acts as a slot within which a metering and dispensing plate is located, said metering and dispensing plate being indicated in general by reference character 26 and reference to FIG. 3 will show a dispensing aperture 27 formed through this base plate 25, substantially on the fore and aft center line 22 and spaced inwardly from the front edge 28 as clearly illustrated in FIG. 3.

The plate 26, is shown as being circular but, of course, it will be appreciated that it can be a segment of a circle or any other configuration and this metering and dispensing plate is journalled for partial rotation within the slot defined by the hopper base 19 and the base plate 15, by means of a spigot 27A extending upwardly from the center of the plate and engaging an aperture 28A within the base 19 of the hopper thus locating the plate for rotation. Alternatively, this spigot could also extend downwardly into a similar or mating aperture (not illustrated) formed in the base plate 25 upon the fore and aft center line 22.

Metering means collectively designated 29 are formed through the plate 26 and in this embodiment, take the form of an elongated slot 30 forming a first metering aperture 31 and a second metering aperture 32 one upon each side of the fore and aft center line 22.

Means are provided to vary the volume of these metering apertures 31 and 32, said means taking the form of movable wall portions 31A and 32A respectively and engaging within the slot to define, between the movable wall and the ends 33, the aforementioned metering apertures 31 and 32.

Figure 8:
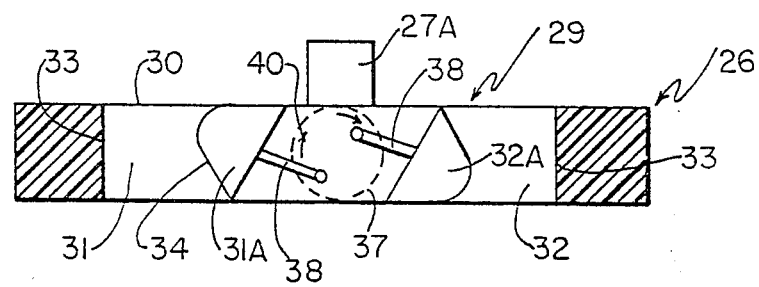
FIG. 8 is an enlarged cross sectional view along the line 8—8 of FIG. 5.

These walls are wide enough to engage the side walls of the slot 30 and include substantially curved inner surfaces 34 as shown in FIGS. 7 and 8.

Means are provided to move these walls relative to the ends 33 of the slot thus varying the volume of the metering apertures 31 and 32, said means being provided in cooperation with an actuator collectively designated 35. This actuator consists of a rod 36 bearably engaging through an aperture within the side wall of the plate 26 so that the inner end 37 of the rod enters the slot 30 centrally between the ends thereof.

Small crank arms 38 are provided with the inner ends engaging within the inner end 37 of the rod 36 and with the outer ends being fixed to the rear walls of the movable walls 31A and 32A respectively, it being understood that the inner ends of the cranks are bearably engaged within the inner end 37 of the rod 36.

References to FIGS. 7 and 8 will show that if the rod 36 is rotated in the direction of arrow 39, the crank arms will be moved to the position shown in FIG. 8 thus drawing the movable walls towards one another and increasing the volume of the metering apertures 31 and 32.

If the rod is rotated in the opposite direction as indicated by arrow 40 and shown in FIG. 8, then the two walls will move apart from one another thus reducing the volume of the metering apertures 31 and 32. If necessary, indicia (not illustrated) can be provided on the outer end portion 41 of the rod 36 to enable the user to ascertain the position of the movable walls and hence the actual effective volume of the metering apertures 31 and 32.

Figure 9:
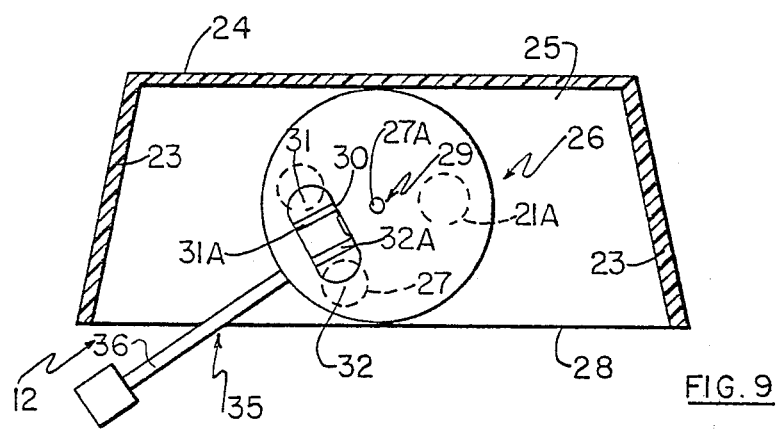
FIG. 9 is a view similar to FIG. 10 but showing the plate in one position.

It will also be noted that the slot 30 is positioned through the discs so that when the disc is in the position illustrated in FIG. 9, one metering aperture 31 is aligned with one of the feeding apertures 21 within the base of the hopper and that the other of the metering apertures 32 is aligned over the dispensing aperture 27 in the base panel 25.

When in the position shown in FIG. 9, fluent material within the hopper will flow through the feeding aperture 21 and fill the metering aperture 31.

Figure 10:
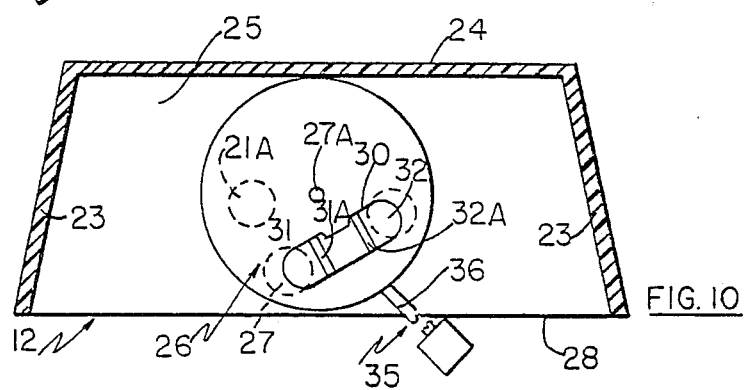
FIG. 10 is a cross sectional view along the line 10—10 of FIG. 1 and showing the plate in the opposite position to that of FIG. 9.

When the plate 26 is moved by means of the actuating handle 36, to the second position illustrated in FIG. 10, the second metering aperture 32 is aligned with the other feeding aperture specifically designated 21A and that the first metering aperture 31 is now aligned with the dispensing aperture 27 so that material contained within the metering aperture 31 and controlled by the position of the movable wall 31A will be dispensed through the aperture 27 into the receptacle 14 situated therebelow.

A reversal of the position of the plate back to FIG. 9 will cause a further reversal of positions so that the metering aperture 32 which is now full of the material, will align with the dispensing aperture 27 and dispense an amount of material similar in volume to that just dispensed from aperture 31.

Under normal conditions, the thickness of the plate and the area of the apertures 31 and 32 are such that when the movable walls are in the position shown in FIG. 8, a level teaspoon of material may be dispensed with a lesser amount depending upon the rotation of handle or rod 36 to move the walls towards the minimum volume position shown in FIG. 7.

Although a pair of feeder apertures 21 and metering apertures 31 and 32 have been shown, nevertheless it will be appreciated that only one of each may be provided if desired with the same adjustment of volume being provided by the movable wall 34.

The thickness of the plate 26 is sufficient to provide the necesary seal between the plate and the base 19 of the hopper on the one hand and the surface of the base plate 25 on the other hand so that spillage of material from the hopper does not occur.

Figure 11:
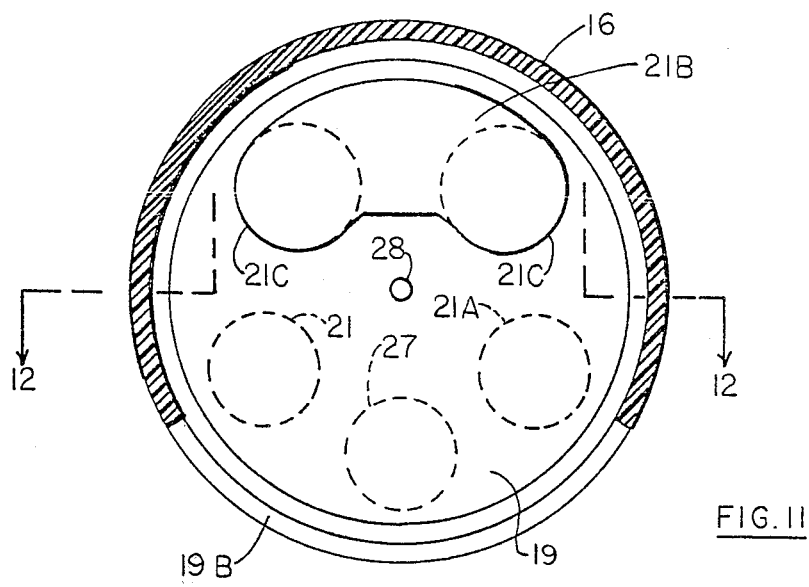
FIG. 11 is a cross sectional view of the preferred embodiment taken along the line 11—11 of FIG. 12.
Figure 12:
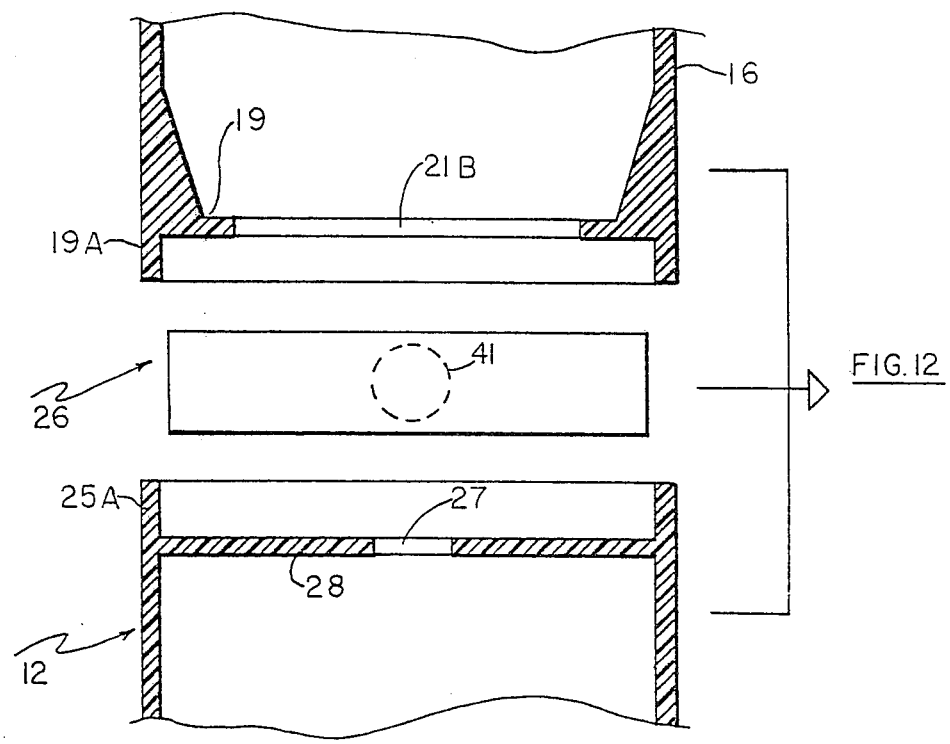
FIG. 12 is a partially sectioned exploded view of the preferred embodiment taken along the line 12—12 of FIG. 11.

FIGS. 11 and 12 show the preferred construction in which the feed apertures 21 and 21A are formed in one arcuately extending aperture 21B formed in the hopper base with arcuately curved end portions 21C situated at each end of the arcuate aperture. Inasmuch as the metering plate engages the base of hopper, the open arc allows the maximum and constant feed flow of the fluent material into the metering plate as the apertures therein align alternately with each end of this open arcuate aperture 21B.

An annular wall 19A depends downwardly from the hopper base 19 and a similar wall or lip extends upwardly from the base plate 25A of the supporting base with the metering plate 26 being enclosed by these annular walls which meet when assembled and which can be adhesively secured together or screw threaded (not illustrated) if desired. An arcuate slot 19B is formed through these walls to allow for the rod 36 of the actuator to extend therethrough. The ends of this arcuate slot limit the movement of the rod in either direction.

This not only encloses the metering plate but prevents any spillage from occurring from between the metering plate and the hopper base.

It will therefore be appreciated that an efficient and easily adjusted dispenser is provided enabling a user to adjust the volume of material dispensed and to repeat the adjusted volume as desired.

Since various modifications can be made in my invention as hereinabove described, and many apparently widely different embodiments of the same made within the spirit and scope of the claims without departing from such spirit and scope, it is intended that all matter contained in the accompanying specification shall be interpreted as illustrative only and not in a limiting sense.

What I claim as my invention is:

1. A dispenser for fluent materials comprising in combination a hopper for holding said material, said hopper including an apertured base, said apertured base including a pair of feeding apertures one on each side of a center line of said base, a metering and dispensing plate supported below said base, actuating means extending from said plate for partial rotational movement thereof relative to the vertical axis of said dispenser from one dispensing position through to another dispensing position and vice versa, means to support said plate relative to said base, dispensing means situated below said plate and operatively connected therewith, and means in said plate for metering fluent material from said hopper and dispensing same through said dispensing means, said means in said plate including aperture means formed through said plate, one of said aperture means aligning with one of said feeding apertures in said base and the other of said apertures aligning with said dispensing means, when said plate is in one dispensing position, and the other of said aperture means aligning with the other of said feeding apertures and the one said aperture means aligning with said dispensing means, when said plate is in the other dispensing position, a pair of movable wall portions one in each of said aperture means in said plate, linkage means operatively extending between said actuating means and said movable wall portions for moving said wall portions relative to said aperture means to vary the volume thereof, said aperture means comprising an elongated slot formed through said plate and having a metering portion at each end thereof, said actuating means including a rod rotatably mounted in said plate and extending into the center of said slot, said linkage means comprising a pair of crank arms each pivotally connected by one end thereof, to one end of said rod and by the other end thereof one each to one of said movable walls.

2. The dispenser according to claim 1 in which said feeding apertures in said base are connected together to form a single arcuately extending feeding aperture, and an annular wall formed around the base of said hopper and around said dispensing means for partially enclosing said plate.

3. A dispenser for fluent materials comprising in combination a hopper for holding said material, support means for said hopper, said hopper including a base having a pair of feeding apertures therethrough, a dispensing plate supported below said base, actuating means extending from said plate, means to support said plate for partial rotation about a vertical axis, by said actuating means, from a metering position to a dispensing position and vice versa, a pair of metering apertures formed through said plate and dispensing means situated below said plate and communicating therewith, said plate being movable from a first position to a second position and vice versa, one of said metering apertures being operatively connected to one of said feeding apertures and the other of said metering apertures being operatively connected to said dispensing means, when said plate is in one position, and the other of said metering apertures being operatively connected with the other of said feeding apertures and said one of said metering apertures being operatively connected to said dispensing means, when said plate is in the other position, means to vary the volume of said metering apertures within limits, said means to vary the volume of said metering apertures being operatively connected to said actuating means and including a movable wall in each of said metering apertures, and linkage means operatively extending between said actuating means and said movable walls, said actuating means including a rod rotatably mounted in said plate, said linkage means comprising a crank arm for each movable wall, said crank arms each being pivotally connected by one end thereof to the inner end of said rod and by the other end thereof, one each to each of said movable walls, the rotation of said rod in one direction moving said movable walls towards one another thereby increasing the volume of said metering apertures and rotation of said rod in the other direction, moving said movable walls away from one another thereby decreasing the volume of said metering apertures.

4. The dispenser according to claim 3, in which said feeding apertures in said base are connected together to form a single arcuately extending feeding aperture, and an annular wall formed around the base of said hopper and around said dispensing means for partially enclosing said plate.

5. The dispenser according to claim 2 or 4 which includes an arcuate slot defined between said base of said hopper and said dispensing means, said actuating means extending through said slot.

* * * * *